United States Patent
Du et al.

(10) Patent No.: US 9,055,458 B2
(45) Date of Patent: Jun. 9, 2015

(54) METHOD AND SYSTEM FOR DYNAMIC AMPDU DURATION CONTROL IN A WIRELESS COMMUNICATION SYSTEM

(71) Applicant: QUALCOMM Incorporated, San Diego, CA (US)

(72) Inventors: Shu Du, Milpitas, CA (US); Zhanfeng Jia, Belmont, CA (US); Ning Zhang, Saratoga, CA (US); Chin-Hung Chen, San Jose, CA (US); James S. Cho, Mountain View, CA (US); Rahul Tandra, San Diego, CA (US); Qinghai Gao, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 13/762,338

(22) Filed: Feb. 7, 2013

(65) Prior Publication Data

US 2014/0219110 A1 Aug. 7, 2014

(51) Int. Cl.
*H04W 24/02* (2009.01)
*H04W 28/00* (2009.01)
*H04L 1/00* (2006.01)
*H04B 7/04* (2006.01)

(52) U.S. Cl.
CPC ............. *H04W 24/02* (2013.01); *H04B 7/0452* (2013.01); *H04L 1/0007* (2013.01)

(58) Field of Classification Search
None
See application file for complete search history.

(56) References Cited

U.S. PATENT DOCUMENTS 7,349,713 B2 * 3/2008 Miyoshi .................. 455/522
7,706,338 B2 * 4/2010 Kondylis et al. ............... 370/338
8,203,940 B1 6/2012 Yuan et al.
8,522,088 B2 * 8/2013 Kim et al. ..................... 714/704
8,681,815 B1 * 3/2014 Liu et al. ...................... 370/473

(Continued)

FOREIGN PATENT DOCUMENTS

CN 101657029 A 2/2010
EP 0794631 A2 9/1997

(Continued)

OTHER PUBLICATIONS

Ginzburg, et al., "Performance Analysis of A-MPDU and A-MSDU Aggregation in IEEE 802.11n", IEEE 2007 Sarnoff Symposium, 2007, pp. 1-5.

(Continued)

*Primary Examiner* — Chi H Pham
*Assistant Examiner* — Shick Hom
(74) *Attorney, Agent, or Firm* — Holland & Hart LLP

(57) ABSTRACT

A method of providing aggregated MAC protocol data unit (AMPDU) duration control in a wireless communication device includes setting an AMPDU duration. Pass/fail statistics are collected for each MPDU of an AMPDU in a time window, W. A packet error rate (PER) difference is calculated between first and last sets of MPDUs for each AMPDU in the window. An average PER difference is calculated across all AMPDUs in the window. When the average PER difference is greater than a first threshold, then the AMPDU duration is decreased. When the difference is less than a second threshold, then the AMPDU duration is increased. When the difference is within the first and the second thresholds, then the method returns to the step of collecting for a next time window. The AMPDU duration can also be adjusted based on detected Doppler and line-of-sight transmissions.

48 Claims, 6 Drawing Sheets

(56) References Cited

U.S. PATENT DOCUMENTS

| | | | |
|---|---|---|---|
| 2003/0063563 A1* | 4/2003 | Kowalski | 370/230 |
| 2011/0080887 A1* | 4/2011 | Krishnaswamy et al. | 370/329 |
| 2011/0188424 A1 | 8/2011 | Ramamurthy et al. | |

FOREIGN PATENT DOCUMENTS

| | | |
|---|---|---|
| EP | 2475143 A1 | 7/2012 |
| WO | WO-0249261 A2 | 6/2002 |
| WO | WO-2011060309 A1 | 5/2011 |
| WO | WO-2013006723 A1 | 1/2013 |

OTHER PUBLICATIONS

IEEE 802.11 "Part 11: Wireless LAN Medium Access Control (MAC) and Physical Layer (PHY) Specifications", Mar. 2012, pp. 1-2793.

IEEE 802.11ac Draft 2.1 "Wireless LAN Medium Access Control (MAC) and Physical Layer (PHY) specifications", Mar. 2012, pp. 1-363.

Selvam, et al., "A Frame Aggregation Scheduler for IEEE 802.11n", 2010 National Conference on Communications (NCC), 2010, pp. 1-5.

Al-Adhami et al., "Experimental Investigation of Link Layer Adaptation in IEEE 802.11n WLANs," Wireless Telecommunications Symposium (WTS), Apr. 18-20, 2012, ISBN 978-1-4577-0579-3, DOI 10.1109/WTS.2012.6266144, London, GB, 7 pgs.

ISA/EPO, International Search Report and Written Opinion of the Internationail Searching Authority, Int'l App. No. PCT/US2014/014062, Jun. 2, 2014, European Patent Office, Rijswijk, NL, 22 pgs.

Tandai et al., "Cross-Layer-Optimized User Grouping Strategy in Downlink Multiuser MIMO Systems," IEEE 69th Vehicular Technology Conference, VTC Spring 2009, Apr. 25-29, 2009, ISBN 978-1-4244-2517-4, DOI 10.1109/VETECS.2009.5073484, Barcelona, ES, 6 pgs.

* cited by examiner

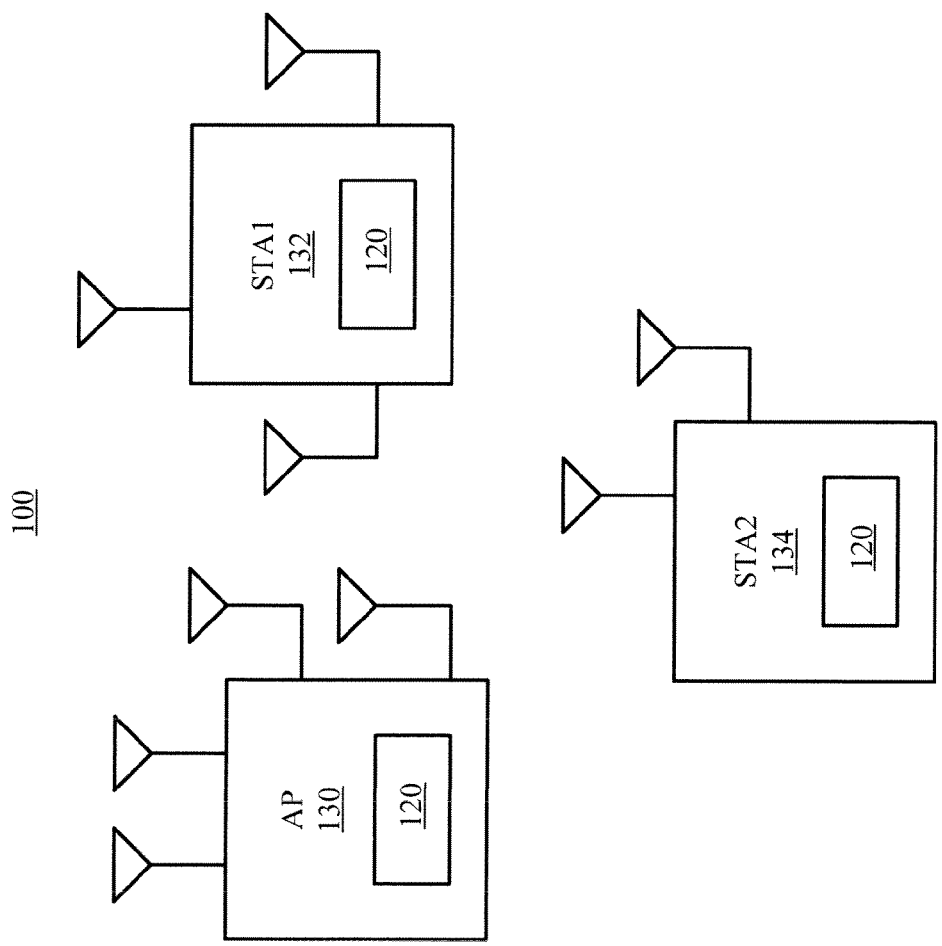

METHOD AND SYSTEM FOR DYNAMIC AMPDU DURATION CONTROL IN A WIRELESS COMMUNICATION SYSTEM

BACKGROUND

The invention relates generally to wireless communication systems, for example dynamic AMPDU duration control in multi-user Wi-Fi® systems.

RELATED ART

The IEEE 802.11 standard refers to a set of standards for implementing wireless local area network (WLAN) communication in the, e.g., 2.4, 3.6, and 5 GHz frequency bands. WLAN communication allows a device to exchange data wirelessly with one or more other devices. Wi-Fi® is a brand name for WLAN products using any of the IEEE 802.11 standards.

IEEE 802.11ac is a new standard being developed to support Very High Throughput (VHT) operations in the 5 GHz frequency band. To obtain this VHT operation, an 802.11ac device uses a wide RF (radio frequency) bandwidth, up to 8 spatial streams using multiple antennas at both the transmitter and receiver (called multiple-input multiple-output or MIMO in the wireless industry), thereby allowing a terminal to transmit or receive signals to/from multiple users in the same frequency band simultaneously. VHT operation also uses a high-density modulation of up to 256 QAM (quadrature amplitude modulation).

The IEEE 802.11 specification defines a data transmission mechanism using an aggregated Mac protocol data unit (AMPDU). Inside a single AMPDU, multiple Mac protocol data units (MPDU) can be encapsulated. Each MPDU encapsulated within (aggregated within) an AMPDU includes its own CRC. Therefore, even in the presence of temporary channel deterioration or interference during the AMPDU transmission, some of the MPDUs can still be received successfully. The receiver of an AMPDU can then use a block acknowledgement (BA) frame to notify the sender which MPDUs within the AMPDU have been successfully received, and the sender can retransmit the failed MPDUs.

A single AMPDU can aggregate (encapsulate) up to a total of 64 MPDUs. However, when using techniques required for very high throughput (VHT), channel conditions can vary markedly over very short intervals of time. The channel degradation can become so severe that MPDUs transmitted at the start of an AMPDU may be received correctly while MPDUs transmitted near the end of the AMPDU are not. Thus the sender needs to decide how many MPDUs should be included within a particular AMPDU because the overall length of the AMPDU is directly related to the total time required to complete the transmission. The problem of deciding upon the number of MPDUs to aggregate (encapsulate) within a specific AMPDU is sometimes referred to as determining an AMPDU aggregation rate (number of MPDUs within a given AMPDU), and is also referred to as determining an AMPDU duration (e.g., the number of ms allotted for the AMPDU transmission).

Traditionally, a sender sets the maximum AMPDU duration as a fixed default number, for example 1 ms. However, if an AMPDU duration is set too long, the sender is likely to encounter an increased risk that some of the MPDUs will become corrupted and thus need retransmission. On the other hand, if the AMPDU duration is set too short, the sender is lowering MAC efficiency because more of the shorter AMPDUs will have to be transmitted to move a given amount of data to a receiver.

In reality, the condition of wireless channels is constantly varying, and it is difficult to determine an optimum AMPDU duration. In general, if the wireless channel deteriorates rapidly, the use of shorter AMPDU durations is indicated, while if the channel is generally stable or is improving, the use a longer AMPDU duration often proves advantageous.

SUMMARY OF THE EMBODIMENTS

To solve the stated problem, methods are provided for dynamically adjusting the AMPDU duration based on the current channel condition, indirectly derived from PER statistics, and in some embodiments from other sources of information such as whether induced Doppler is detected, whether the transmission is line-of-sight, and whether the transmission is high-user MU-MIMO or BF.

A method for providing an aggregated MAC protocol data unit (AMPDU) duration control in a wireless communication device includes setting an initial AMPDU duration, transmitting data using the initial setting, and collecting pass/fail statistics for each MPDU of each AMPDU within a predefined time window (window). A packet error rate (PER) difference between first and last sets of MPDUs for each transmitted AMPDU in the window is calculated, and an average PER difference across all the AMPDUs within the window is calculated. The average difference is compared with predetermined upper and lower threshold values. When the average is greater than the upper threshold, the AMPDU duration is decreased by a first predetermined amount. When the average is less than the lower threshold the AMPDU duration is increased by a second predetermined amount. And when the average lies within the thresholds, the AMPDU duration remains unchanged.

A method for shortening the AMPDU duration in a deteriorating channel condition is provided, such as in the presence of significant induced Doppler, as is a method for lengthening the duration in stabilizing channel conditions, such as in the presence of line-of-sight (LoS) transmissions. A method for shortening the AMPDU duration in the presence of multi-user MIMO transmission is also provided, as is a method for lengthening the AMPDU duration in the presence of single-user transmission. A computer-readable medium storing instructions for providing these duration control methods is provided, and a wireless communication system embodying the duration control methods is also provided.

BRIEF DESCRIPTION OF THE DRAWINGS

FIG. 1A illustrates an example basic service set (BSS) including an AP and two stations, STA1 and STA2.

DETAILED DESCRIPTION OF THE DRAWINGS

What is described below are embodiments for methods and systems for controlling an aggregated media access control (MAC) protocol data unit (AMPDU) duration for achieving efficient MAC operation for use in multi-user (MU) WLAN systems, including Wi-Fi® systems. For WLAN systems, and especially MU Wi-Fi® systems, a dynamic AMPDU duration control tailors AMPDU duration based upon current channel conditions, as determined by packet error rate (PER) statistics.

FIG. 1A illustrates an example basic service set (BSS) 100 including an AP 130 and two stations STA1 132 and STA2 134. In one embodiment, each device 130, 132, and 134 includes a transceiver 120 (transmitter and receiver) configured for operation in accordance with a WLAN standard (e.g., the IEEE 802.11ac standard). FIG. 1A will be referred to in describing the following figures for illustration. However, limitations should not be placed on embodiments of the disclosure based on the illustration of the BSS 100. For example, BSS 100 may include more than two STAs (not illustrated for simplicity of describing embodiments of the disclosure). Additionally, the AP 130 may be a dedicated AP, soft-AP or otherwise a STA acting as an AP, etc. for the BSS 100. Furthermore, while two, three or four antennas are illustrated for each device, embodiments of the disclosure are not limited to specific numbers of antennas or specific numbers of transmit/receive chains for the devices.

Figure 1B:
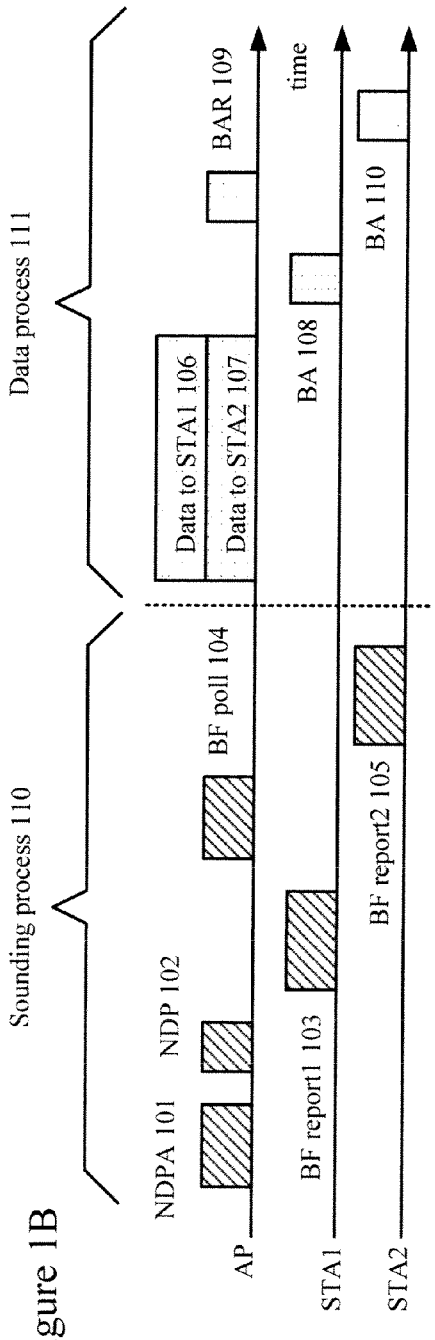
FIG. 1B illustrates an exemplary communication timing diagram between the AP and the stations STA1 and STA2 shown in FIG. 1A, including a sounding process for estimating current communication channel quality.

FIG. 1B illustrates an exemplary communication timing diagram between the AP 130 and the stations STA1 132 and STA2 134 shown in FIG. 1A, including a sounding process for estimating current communication channel quality. The communication illustrated in FIG. 1B includes two processes: a sounding process 110 and a data process 111. Sounding process 110 begins with the AP 130 sending a null data packet announcement (NDPA) signal 101 to stations STA1 132 and STA2 134, wherein the NDPA signal 101 indicates that no data will be sent in the subsequent packet. Following the NDPA signal 101, the AP 130 sends a null data packet (NDP) signal 102. This NDP signal 102 can serve as a known signal for obtaining channel characteristics from the stations STA1 132 and STA2 134. After receipt of the NDP signal 102, station STA1 132 can send to the AP 130 its channel status information (CSI) in a beamforming (BF) report1 signal 103. In receiving the BF report1 signal 103, the AP 130 can send a BF poll signal 104 indicating that the station STA2 134 can send to the AP 130 its CSI. In response to receiving the BF poll signal 104, STA2 134 can send to the AP 130 its CSI in a BF report2 signal 105.

Using the CSI from its associated stations STA1 132 and STA2 134, the AP 130 can begin the data process 111 by concurrently sending MU multiple input multiple output (MU-MIMO) data 106 to STA1 132 and MU-MIMO data 107 to STA2 134. Note that although the term MU-MIMO is used to describe the data, the data may also be single user multiple input multiple output (SU-MIMO) in other embodiments. After receiving the data 106, the station STA1 132 can send to the AP 130 a block acknowledgement (BA) signal 108. Upon receiving the BA signal 108 from STA1 132, the AP 130 can send to STA2 134 a block acknowledgement request (BAR) signal 109. In response to receiving BAR signal 109, STA2 134 can send to the AP 130 its BA signal 110. Note that although FIG. 1A shows an AP 130 associated with two stations, in other embodiments the AP 130 can be associated with any number of stations, each of which can send a BF report signal during the sounding process 110 and a BA signal during the data process 111.

Figure 2:
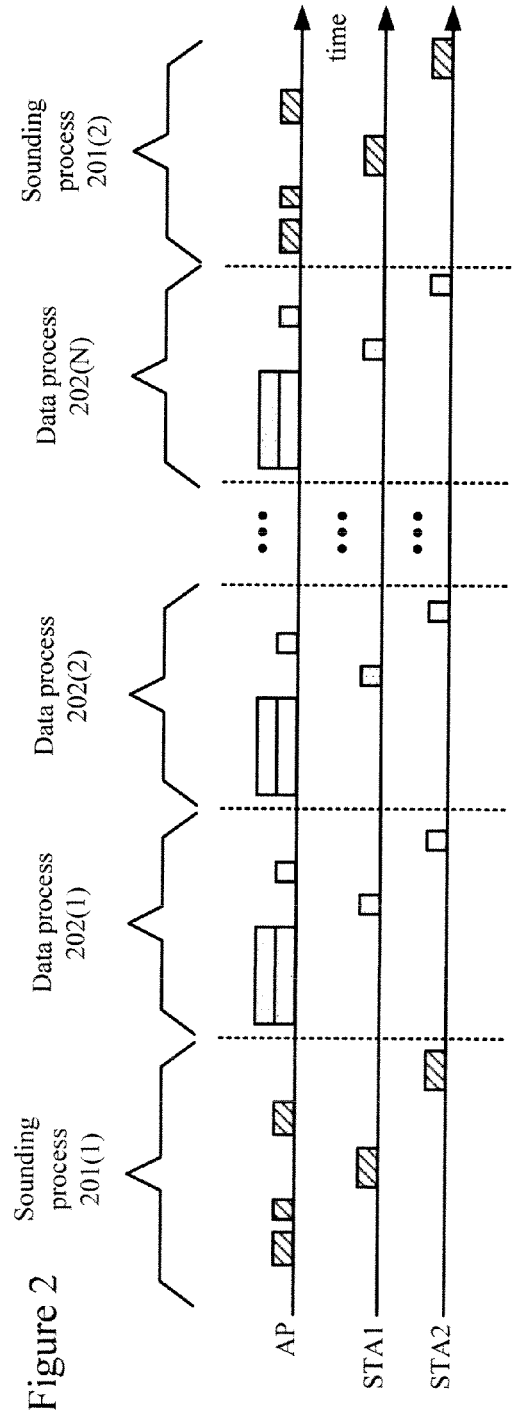
FIG. 2 illustrates a timing diagram, between the AP and the stations STA1 and STA2 shown in FIG. 1A, including a first sounding process followed by a plurality of data processes and a second sounding process.

Because the sounding process has a large overhead in terms of medium airtime, the AP 130 can be configured not to do sounding prior to every MU-MIMO data transmission, as illustrated in the timing diagram of FIG. 2.

FIG. 2 illustrates a first sounding process 201(1) followed by a plurality of data processes 202(1)-202(N), wherein N is an integer greater than 1. After the N data processes are complete, a second sounding process 201(2) is performed before another plurality of data processes are performed (not shown).

A possible data rate for a transmission can be limited by the number of spatial streams used in the transmission, the modulation type, and the coding rate. Hence, the number of spatial streams, modulation type, coding rate, and resulting maximum data rates (or a portion of such information) may be included in a modulation and code scheme (MCS) for the STA. For example, the IEEE 802.11 family of standards defines various modulation and coding schemes, and represents them by index values. In one specific example regarding IEEE 802.11n (but which is applicable to other WLAN systems, e.g., 802.11ac), Table 1 below (taken from IEEE 802.11n) shows exemplary MCS index values and their respective spatial streams, modulation types, coding rates, and resulting maximum data rates. Note that data rates are provided for both 20 MHz and 40 MHz channels, as well as 800 ns and 400 ns guard intervals (GIs).

TABLE 1

| MCS | Spatial streams | Modulation type | Coding rate | Data rate (Mbit/s) | | | |
|---|---|---|---|---|---|---|---|
| | | | | 20 MHz channel | | 40 MHz channel | |
| | | | | 800 ns GI | 400 ns GI | 800 ns GI | 400 ns GI |
| 0 | 1 | BPSK | 1/2 | 6.50 | 7.20 | 13.50 | 15.00 |
| 10 | 2 | QPSK | 3/4 | 39.00 | 43.30 | 81.00 | 90.00 |
| 19 | 3 | 16-QAM | 1/2 | 78.00 | 86.70 | 162.00 | 180.00 |
| 31 | 4 | 64-QAM | 5/6 | 260.00 | 288.80 | 540.00 | 600.00 |

The transmitter (e.g., from transceiver 120 of AP 130) attempts to determine an acceptable MCS under which parameters to send the data frames. Using a higher MCS may increase for some receivers' failure to decode the data frames, thereby increasing the PER. However, using a lower MCS may cause inefficiency in medium usage and network congestion, thus slowing transmission speed. Therefore, choosing a proper MCS for data frame transmissions is a tradeoff between reliability and speed in order to find an acceptable compromise.

The AMPDU duration problem caused by channel variation becomes increasingly challenging in MU-MIMO transmissions. Based upon simulations, the signal-to-interference-and-noise-ratio (SINR) of MU-MIMO transmissions may deteriorate at significantly different rates under different channel conditions, or when using different MU-MIMO levels (e.g., with 2-user or 3-user). For example, if a MU-MIMO transmission occurs within a channel having induced Doppler, the channel can deteriorate rapidly after sounding. On the other hand, when a channel is relatively stable, SINRs generally degrade much more slowly. Similarly, when different MU-MIMO levels (1 user, 2 users, or 3 users) are employed, SINRs after sounding can degrade at significantly different speeds. In general, the higher the MU-MIMO level, the faster the SINR will degrade after a sounding.

Figure 3:
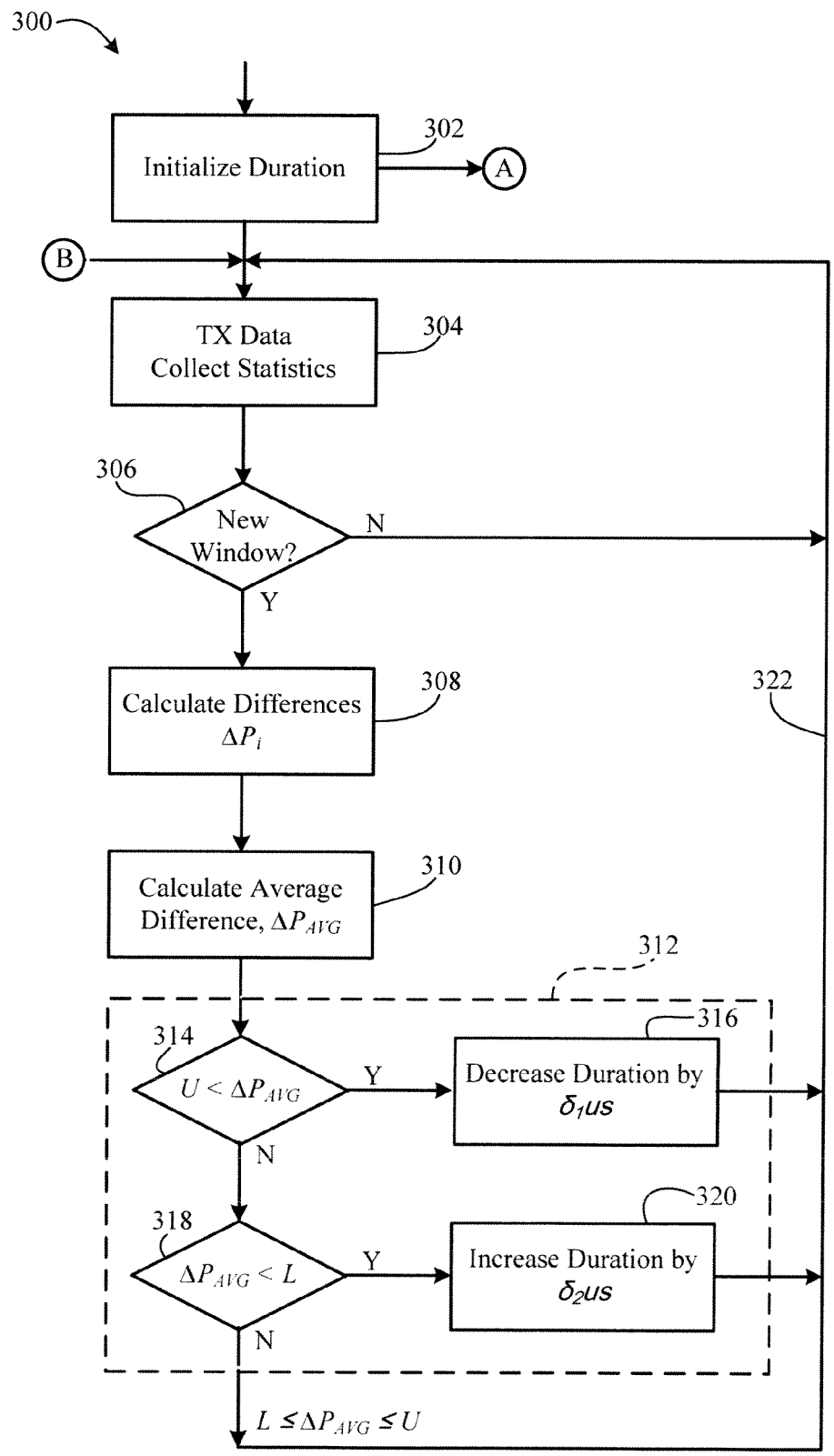
FIG. 3 illustrates an exemplary aggregated MAC protocol data unit (AMPDU) duration control method for a communication system, such as the communication system illustrated in FIG. 1A.

FIG. 3 illustrates an exemplary aggregated MAC protocol data unit (AMPDU) duration control method 300 for a communication system, such as the communication system illustrated in FIG. 1A. The method 300 begins at 302 by initializing an AMPDU duration to a predetermined value, and initializing a window of time duration, W. The number of MPDUs encapsulated within each AMPDU is selected to fit within the initialized AMPDU duration. In one embodiment, the window, W, is open for an interval that corresponds to some multiple of the AMPDU duration. For example, if the initial time allotted for transmission of a single AMPDU is T and the window is to be open for 10T, then 10 AMPDUs will be transmitted during the window, W. In another embodiment, the window is open for a single AMPDU duration only, a new window opening for each successive AMPDU.

At 304 the AMPDUs are transmitted, and pass/fail statistics are received from the receiving station(s) indicating whether each of the transmitted MPDUs was successfully received, or must be retransmitted. For a specific destination, or a specific destination group if using MU-MIMO, the pass/fail statistics are continuously collected for every AMPDU transmitted, and are converted to packet-error-rates (PER), one such PER corresponding to each of the transmitted MPDU positions inside the AMPDU. For example, for the nth MPDU inside the AMPDU, its corresponding PER is calculated as the total number of successful transmissions received by the station divided by the total number of transmissions sent by the AP 130 at the nth MPDU of every AMPDU.

At 306 a test is performed to determine whether the window, W, has completed, thus meaning the AMPDUs have been transmitted and pass/fail statistics (PER) have been collected for every MPDU within each AMPDU. If the window is not completed, the process continues via return path 322 to 304. When the window is completed, the process advances to 308.

At 308 and 310, calculations as described below are performed on the collected statistics, and at 312 the results of the calculations are used to adjust the current AMPDU duration for use during a next window, W. The process of window opening, AMPDU transmission, statistics collection, window closing, calculation, and AMPDU duration adjustment continues until all the data has been transmitted, or until otherwise terminated. The adjusted AMPDU duration is used for transmission of the AMPDUs during a next window. In the embodiment that transmits a single AMPDU only during each window, each AMPDU except the first will use the duration adjusted following the preceding window. This single-AMPDU embodiment is not separately illustrated, but in such an example FIG. 3 would be altered such that flow would always advance from 306 to 308, unlike the multiple-AMPDU embodiment method illustrated in FIG. 3.

At 308, a PER difference, LP, is calculated for each MPDU position in an AMPDU. In one embodiment, the difference is equal to the PER corresponding to the final MPDU of the transmitted AMPDU minus the PER corresponding to the first MPDU of the AMPDU, i.e., $\Delta P = PER_{FINAL} - PER_{FIRST}$. Thus, the difference, LP, represents a change in the channel condition over the duration of a single AMPDU. In some embodiments, one difference, LP, is calculated for each AMPDU transmitted during the window, W. Thus, if 10 AMPDUs were transmitted during the window, there will be 10 differences calculated at 308.

In another embodiment, the difference, LP, is determined by examining a change in channel condition as reflected by groups of sequential MPDUs selected from the start and from the end of an AMPDU. For one example, assume a shortened AMPDU includes 58 MPDUs, numbered 1 through 58. Also assume that a group of 3 sequential MPDUs taken from the start of the AMPDU and another 3 sequential MPDUs taken from the end of the same AMPDU are to be used to calculate the difference $\Delta P$, then $\Delta P = ((PER_{56} + PER_{57} + PER_{58}) - (PER_1 + PER_2 + PER_3))/3$, where $PER_{56}$ corresponds to the PER for the $56^{th}$ MPDU of the shortened AMPDU, and so on.

At 310, an average of the $\Delta P$s over all the AMPDUs transmitted during the window, W, is calculated. The average $\Delta P$ is referred to in FIG. 3 as $\Delta P_{AVG}$ and is equal to the sum of the individual $\Delta PS$ divided by the number of AMPDUs transmitted during the window. Following the previous example, $\Delta P_{AVG} = (\Delta P_1 + \Delta P_2 + \ldots + \Delta P_{10})/10$, where $\Delta P_1$ is the difference corresponding to the first AMPDU transmitted, and so on. In a single-AMPDU embodiment, there is a single difference only, e.g., $\Delta P_1$, and therefore $\Delta P_{AVG} = \Delta P_1$.

312 is indicated by a dashed line and includes 314, 316, 318 and 320. At 312, $\Delta P_{AVG}$ is used to adjust the current AMPDU duration for use during a next window, W. If $\Delta P_{AVG}$ exceeds a predefined upper threshold, U (314), it suggests that the channel condition is deteriorating too rapidly, and the AMPDU duration is shortened by $\delta_1$ μs at 316. In some embodiments, the adjusted AMPDU duration must not be allowed to become smaller than dms, where both $\delta_1$ and d are pre-defined values. Similarly, if $\Delta P_{AVG} < L$, L being a predefined lower threshold (318), it suggests that the channel is not deteriorating too rapidly, and the AMPDU duration is increased by $\delta_2$ μs at 320. In some embodiments, the adjusted AMPDU duration must not be allowed to become greater than Dms, where both $\delta_2$ and D are pre-defined values. When $\Delta P_{AVG}$ is within the two threshold values, i.e., $L \leq \Delta P_{AVG} \leq U$, the AMPDU duration is unchanged for the next window, W. In one embodiment, the exemplary value of $\delta_1$ and $\delta_2$ can be 200 μs, the minimum AMPDU duration d can be 100 μs, and the maximum AMPDU duration of D can be 4000 μs. These exemplary values, and others set forth below, have been chosen based upon computer simulations of the illustrated methods.

After the AMPDU duration is adjusted, the method flows along return path 322 to 304 to begin another window, W, and transmit and collect pass/fail statistics using the adjusted AMPDU duration. Duration adjustments are made at the end of each window, W, and are used during the next window.

In some embodiments, the calculation of the difference, $\Delta P$, (308) is performed as the pass/fail statistics are collected (304), while the calculation of the average difference, $\Delta P_{AVG}$, (310) and the duration adjustment (312) occur after the new window test (306), as they do in FIG. 3. This alternative embodiment is not illustrated.

Figure 4A:
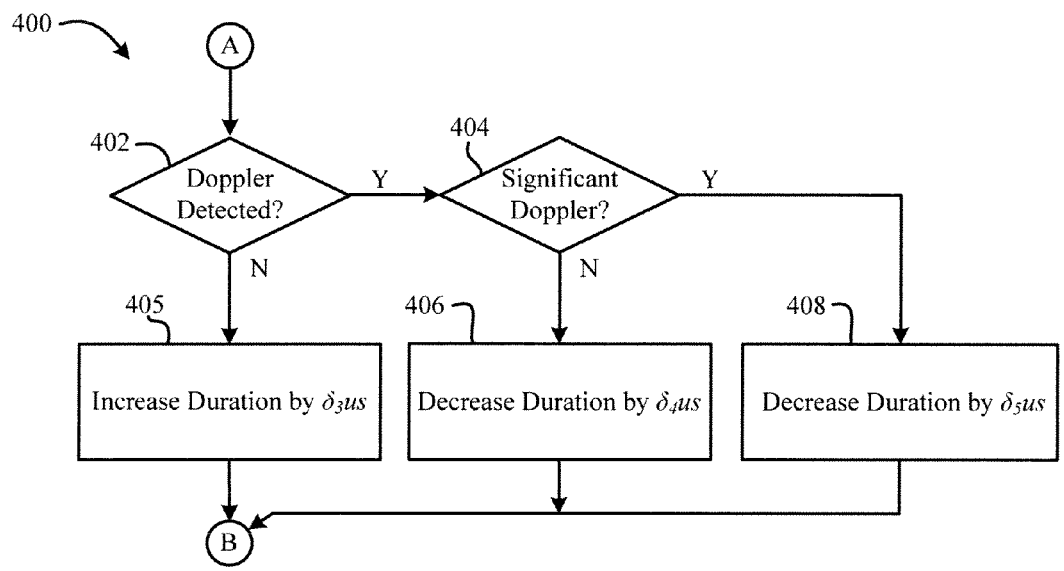
FIG. 4A illustrates an exemplary method for controlling an aggregated MAC protocol data unit (AMPDU) duration in the presence of significant induced Doppler as part of the method illustrated in FIG. 3.
Figure 4B:
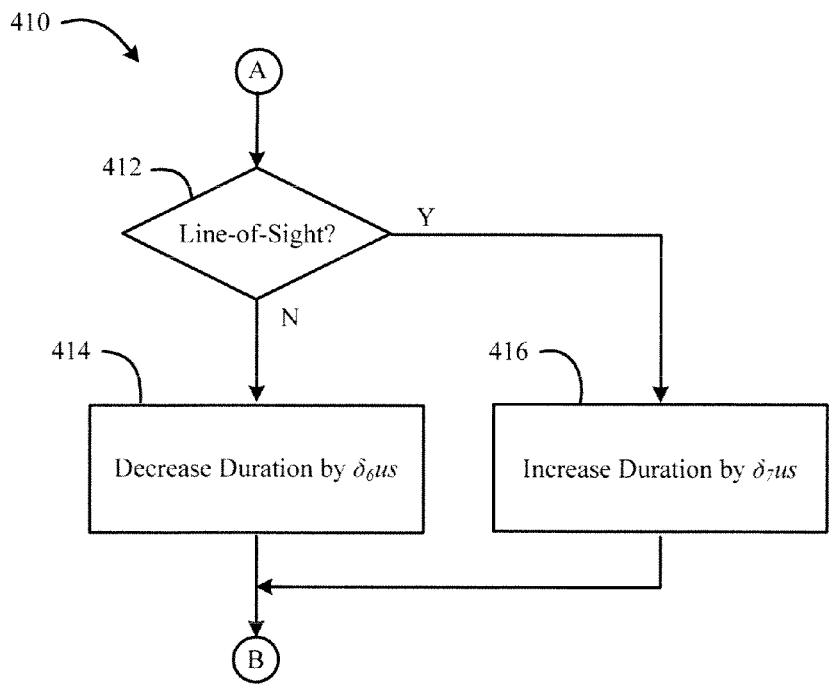
FIG. 4B illustrates an exemplary method for controlling an aggregated MAC protocol data unit (AMPDU) duration for line-of-sight (LoS) transmissions as part of the method illustrated in FIG. 3.

In some embodiments, the AMPDU duration is dynamically adjusted based on other sources of information. For example, a PHY layer may have the capability to detect that a channel to some destination includes Doppler, or is line-ofsight (LoS). When such information is available, it can be used to advantageously adjust the AMPDU duration to the destination. FIGS. 4A and 4B illustrate examples of such embodiments.

In some embodiments, a first AMPDU in a time window, W, is transmitted and MPDU pass/fail statistics are collected to determine channel performance and to determine an initial value for the AMPDU duration (not illustrated). In some embodiments, the test for Doppler and for beam-forming/number of user MIMO can be performed for a first AMPDU of the time window, W (not illustrated).

FIG. 4A illustrates an exemplary method 400 for controlling an aggregated MAC protocol data unit (AMPDU) duration in the presence of significant Doppler as part of the method illustrated in FIG. 3. The method 400 includes tests at steps 402, 404, and duration adjustments at steps 405, 406, and 408. The method 400 is entered from the symbol A in FIG. 3, and exits to the symbol B in FIG. 3. When no Doppler is detected, the method 400 can increase the AMPDU duration by a value of $\delta_3$ μs at step 405, and then returns via the symbol B to a corresponding symbol B at 304 of FIG. 3. When Doppler is detected (402), a second test at 404 determines whether significant Doppler is detected, and if so, the duration of an AMPDU for a next window, W, is decreased by a value of $\delta_5$ μs at 408. The phrase "significant Doppler" means that not only has Doppler been detected, but that the degree of Doppler exceeds a predetermined threshold. Otherwise, when Doppler has been detected, but not significant Doppler, the duration is decreased at 406 by a value of $\delta_4$ μs. In one exemplary implementation, $\delta_3$, $\delta_4$ and $\delta_5$ can be 0 μs, 200 μs and 400 μs, respectively (values based on computer simulation).

FIG. 4B illustrates an exemplary method 410 for controlling an aggregated MAC protocol data unit (AMPDU) duration for line-of-sight (LoS) transmissions as part of the method illustrated in FIG. 3. The method 410 includes a test at 412, and duration adjustments at 414 and 416. The method 410 is entered from the symbol A in FIG. 3, and returns to the symbol B in FIG. 3. When no line-of-sight is detected, the duration is decreased by a value of $\delta_5$ μs. When a line-of-sight transmission is detected, the AMPDU duration is increased by a value of $\delta_7$ μs. In one exemplary implementation, $\delta_6$ and $\delta_7$ can be 0 μs and 200 μs, respectively (values based on computer simulation).

Figure 4C:
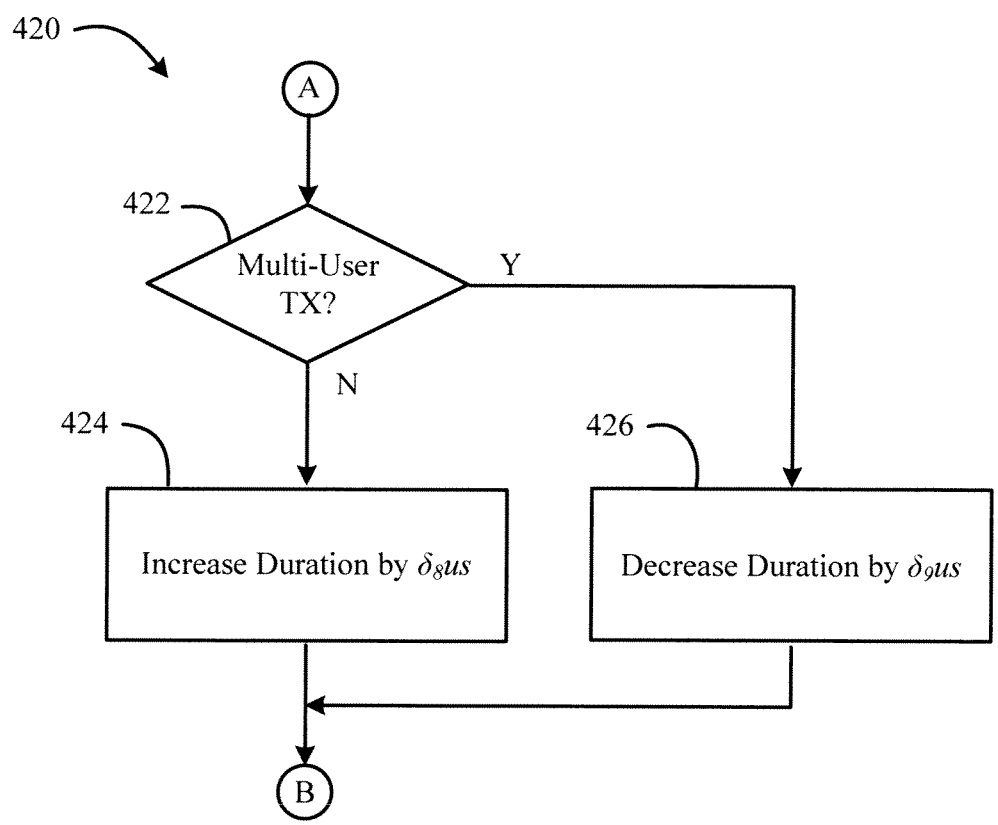
FIG. 4C illustrates an exemplary method for controlling an aggregated MAC protocol data unit (AMPDU) duration for multi-user transmissions as part of the method illustrated in FIG. 3.

In another embodiment, illustrated in FIG. 4C, when the sender is performing single-user transmission, the AMPDU duration can be increased, because the channel degradation is slower than when the sender is performing multi-user transmission. Conversely, when the sender is performing multi-user transmission, the AMPDU duration can be decreased, because the channel degradation is faster than when the sender is performing single-user transmission. The method of FIG. 4C is designated generally by reference numeral 420 and begins at reference symbol A from FIG. 3, and returns to the symbol B in FIG. 3. A test at 422 of FIG. 4C determines whether a transmission is a multi-user transmission, and when it is not, the AMPDU duration is increased by a value of $\delta_8$ μs at 424. When the transmission is a multi-user transmission, the duration is decreased by a value of $\delta_9$ μs at 426. In one exemplary implementation, $\delta_8$ and $\delta_9$ can be 0 μs and 400 μs, respectively (values based on computer simulation).

In various embodiments, methods of the disclosure relating to FIG. 3 may include one of the methods in FIGS. 4A-4C, a combination of any two, or a combination of all three. For example, a duration adjustment of the AMPDU may be some combination of the determined adjustments between the various methods of FIGS. 4A-4C, such as, for example, an averaging, weighted averaging, vote check system, system of priority, or other methods of combination for a person having ordinary skill in the art.

Figure 5:
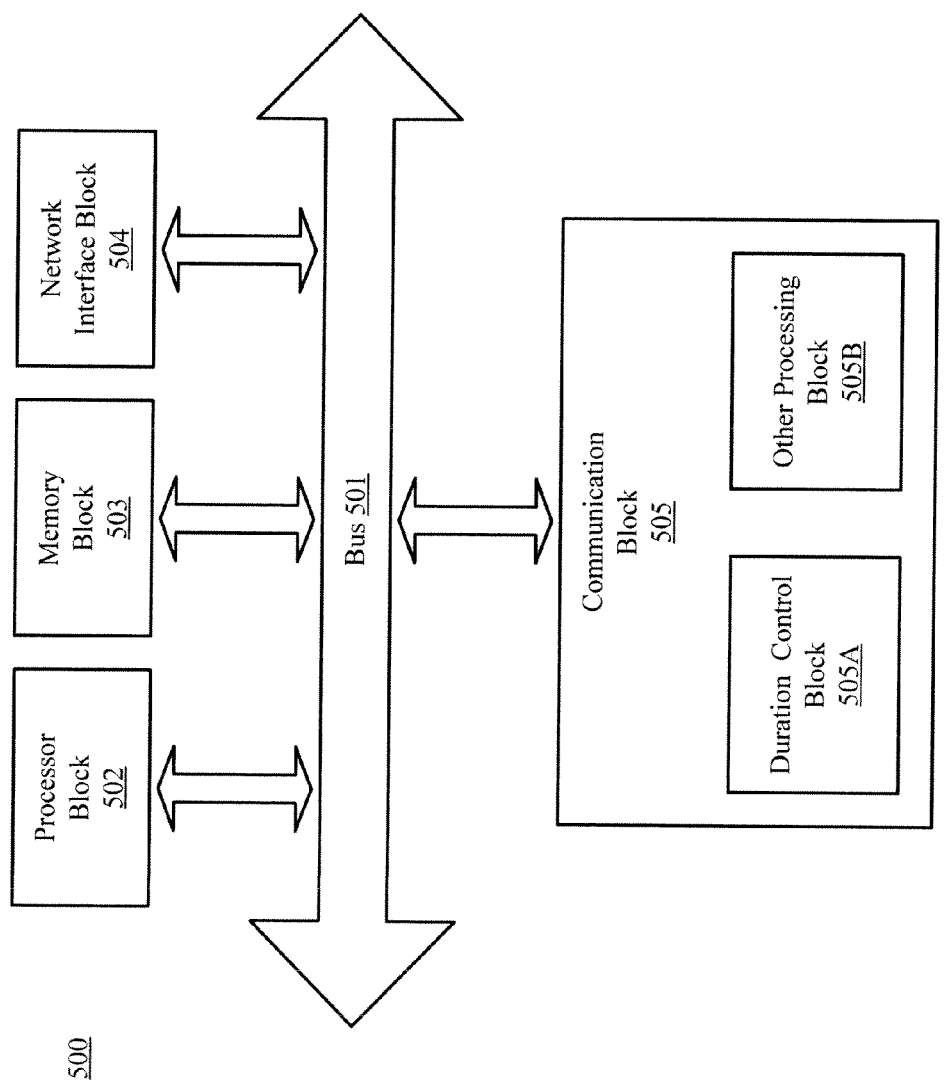
FIG. 5 illustrates a simplified electronic device including a rate control block that can perform the dual-mode rate control method shown in FIGS. 3, 4A, 4B, and 4C.

Additionally, certain aspects of the AMPDU duration control method 300 may take the form of an entirely software embodiment (including firmware, resident software, microcode, etc.), or an embodiment combining software and hardware aspects that may all generally be referred to herein as a "circuit," "module," or "system," as illustrated in FIG. 5. Furthermore, embodiments of the disclosure may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette), optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions (e.g., executable by one or more processing units). In addition, machine-readable signal medium embodiments may be embodied in an electrical, optical, acoustical, or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Although the duration control methods can be performed by an AP, an electronic device having wireless capability typically includes certain components that may or may not be characterized as part of an AP. Indeed, in some embodiments, certain components of the electronic device may be characterized as outside the AP, but still assist in one or more steps of the data scheduling technique.

FIG. 5 illustrates a simplified electronic device 500 including a duration control block 505A, which can substantially perform the AMPDU duration control method 300. The electronic device 500 may be a notebook computer, a desktop computer, a tablet computer, a netbook, a mobile phone, a gaming console, a personal digital assistant (PDA), or other electronic system having wireless (and wired, in some cases) communication capabilities.

The electronic device 500 can include a processor block 502 (possibly including multiple processors, multiple cores, multiple nodes, and/or implementing multi-threading, etc.). The electronic device 500 can also include a memory block 503, which may include cache, SRAM, DRAM, zero capacitor RAM, Twin Transistor RAM, eDRAM, EDO RAM, DDR RAM, EEPROM, NRAM, RRAM, SONOS, PRAM, and/or another type of memory cell array. The electronic device 500 also includes a network interface block 504, which may include at least a WLAN 802.11 interface. Other network interfaces may include a Bluetooth interface, a WiMAX interface, a ZigBee® interface, a Wireless USB interface, and/or a wired network interface (such as an Ethernet interface, or a powerline communication interface, etc.). The processor block 502, the memory block 503, and the network interface block 504 are coupled to a bus 501, which may be implemented in accordance with PCI, ISA, PCI-Express, HyperTransport®, InfiniBand®, NuBus, AHB, AXI, or another bus standard.

The electronic device 500 also includes a communication block 505 that can include a duration control block 505A and another processing block 505B. The other processing block 505B may include, but is not limited to, portions of a transceiver for processing received signals, for processing to be transmitted signals, and for coordinating actions of the receiver and transmitter portions. Other embodiments may include fewer or additional components not illustrated in FIG. 5, such as video cards, audio cards, additional network interfaces, and/or peripheral devices. In one embodiment, the memory block 503 may be connected directly to the processor block 502 to increase system processing.

The above description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of providing aggregated MAC protocol data unit (AMPDU) duration control in a wireless communication device, the method comprising:
   initializing an AMPDU duration;
   setting a time window, W, to a multiple of the AMPDU duration;
   collecting pass/fail statistics for a first set of MAC protocol data units (MPDUs) and a second set of MPDUs from a data transmission during the time window;
   using the collected pass/fail statistics, calculating a packet error rate (PER) difference, $\Delta P$, between the first set of MPDUs and the second set of MPDUs for each AMPDU in the time window;
   calculating an average PER difference, $\Delta P_{AVG}$, across all AMPDUs in the time window;
   performing one action from a group comprising:
      if $\Delta P_{AVG}$ is greater than an upper threshold, decreasing the AMPDU duration by a first value,
      if $\Delta P_{AVG}$ is less than a lower threshold, increasing the AMPDU duration by a second value, and
      if $\Delta P_{AVG}$ is within the upper threshold and the lower threshold, continuing from a next window; and
   continuing from setting the time window.

2. The method of claim 1, wherein calculating the $\Delta P$ between the first set of MPDUs and the second set of MPDUs further comprises:
   determining a packet error rate for a first integer N MPDUs of the AMPDU, wherein the first N MPDUs are included in the first set of MPDUs and N is a positive integer;
   determining a packet error rate for a separate N MPDUs of the AMPDU, wherein the second N MPDUs are included in the second set of MPDUs;
   subtracting the packet error rate for the first N MPDUs from the packet error rate for the second N MPDUs;
   dividing the result of the subtraction by N; and
   using the resulting quotient as the packet error rate difference, $\Delta P$, for the AMPDU.

3. The method of claim 2, wherein calculating an average PER difference across all AMPDUs in the window comprises:
   forming a sum of the packet error rate differences; and
   dividing the sum by a total of AMPDUs transmitted during the time window to form an average PER difference, $\Delta P_{AVG}$.

4. The method of claim 1, wherein the upper threshold is 0.2 microseconds.

5. The method of claim 1, wherein the lower threshold is 0.05 microseconds.

6. The method of claim 1, wherein the first value is 200 microseconds and the second value is 200 microseconds.

7. The method of claim 1, wherein the at least one action from the group further comprises:
   preventing the AMPDU duration from being decreased to less than a first duration limit; and
   preventing the AMPDU duration from being increased to greater than a second duration limit.

8. The method of claim 7, wherein the first duration limit is 100 microseconds and the second duration limit is 4000 microseconds.

9. The method of claim 1, wherein each time window has a duration equal to a single AMPDU duration.

10. A method of providing aggregated media access control (MAC) protocol data unit (AMPDU) duration control in a wireless communication device, the method comprising:
   for a first AMPDU in a time window, W, detecting if a Doppler effect exists for a data transmission;
   decreasing the initial AMPDU duration if the Doppler effect is detected; and
   increasing the initial AMPDU duration if the Doppler effect is not detected.

11. The method of claim 10, further comprising if the Doppler effect is detected, determining if the detected Doppler effect is significant, wherein:
   increasing the initial AMPDU duration if the Doppler effect is not detected is by a first value, and
   decreasing the initial AMPDU duration if the Doppler effect is detected is by:
      a second value if the Doppler effect is detected but is not determined to be significant, and
      a third value if the Doppler effect is detected and is determined to be significant, wherein the second value does not equal the third value.

12. The method of claim 11, wherein the first value is 0 microseconds, the second value is 200 microseconds, and the third value is 400 microseconds.

13. A method of providing aggregated media access control (MAC) protocol data unit (AMPDU) duration control in a wireless communication device, the method comprising:

determining, by a wireless communication device, if a data transmission between two devices is line-of-sight (LoS) communication;
if not determined that the data transmission is LoS communication, decreasing the initial AMPDU duration by a first value at the wireless communication device, and
if determined that the data transmission is LoS communication, increasing the initial AMPDU duration by a second value at the wireless communication device.

14. The method of claim 13, wherein the first value is 0 microseconds, and the second value is 200 microseconds.

15. A method of providing aggregated media access control (MAC) protocol data unit (AMPDU) duration control in a wireless communication device, the method comprising:
determining, by the wireless communication device, if data is being transmitted between devices using multi-user beam forming (MU-BF);
if determined that MU-BF is not used, increasing an initial AMPDU duration by a first value at the wireless communication device; and
if determined that MU-BF is used, decreasing the initial AMPDU duration by a second value at the wireless communication device.

16. The method of claim 15, wherein the first value is 0 microseconds and the second value is 400 microseconds.

17. A non-transitory, computer-readable medium storing computer-executable instructions for providing aggregated MAC protocol data unit (AMPDU) duration control in a wireless communication device, the instructions when executed by a processor cause the processor to execute a process comprising:
initializing an AMPDU duration;
setting a time window, W, to a multiple of the AMPDU duration;
collecting pass/fail statistics for a first set of MAC protocol data units (MPDUs) and a second set of MPDUs from a data transmission during the time window;
using the collected pass/fail statistics, calculating a packet error rate (PER) difference, $\Delta P$, between the first set of MPDUs and the second set of MPDUs for each AMPDU in the time window;
calculating an average PER difference, $\Delta P_{AVG}$, across all AMPDUs in the time window;
performing one action from a group comprising:
if $\Delta P_{AVG}$ is greater than an upper threshold, decreasing the AMPDU duration by a first value,
if $\Delta P_{AVG}$ is less than a lower threshold, increasing the AMPDU duration by a second value, and
if $\Delta P_{AVG}$ is within the upper threshold and the lower threshold, continuing from a next window; and
continuing from setting the time window.

18. The computer-readable medium of claim 17, wherein calculating the $\Delta P$ between the first set of MPDUs and the second set of MPDUs further comprises:
determining a packet error rate for a first integer N MPDUs of the AMPDU, wherein the first N MPDUs are included in the first set of MPDUs and N is a positive integer;
determining a packet error rate for a separate N MPDUs of the AMPDU, wherein the second N MPDUs are included in the second set of MPDUs;
subtracting the packet error rate for the first N MPDUs from the packet error rate for the second N MPDUs;
dividing the result of the subtraction by N; and
using the resulting quotient as the packet error rate difference, $\Delta P$, for the AMPDU.

19. The computer-readable medium of claim 18, wherein calculating an average PER difference across all AMPDUs in the window comprises:
forming a sum of the packet error rate differences; and
dividing the sum by a total of AMPDUs transmitted during the time window to form an average PER difference, $\Delta P_{AVG}$.

20. The computer-readable medium of claim 17, wherein the upper threshold is 0.2 microseconds.

21. The computer-readable medium of claim 17, wherein the lower threshold is 0.05 microseconds.

22. The computer-readable medium of claim 17, wherein the first value is 200 microseconds and the second value is 200 microseconds.

23. The computer-readable medium of claim 17, wherein the at least one action from the group further comprises:
preventing the AMPDU duration from being decreased to less than a first duration limit; and
preventing the AMPDU duration from being increased to greater than a second duration limit.

24. The computer-readable medium of claim 23, wherein the first duration limit is 100 microseconds and the second duration limit is 4000 microseconds.

25. The computer-readable medium of claim 17, wherein each time window has a duration equal to a single AMPDU duration.

26. A non-transitory, computer-readable medium storing computer-executable instructions for providing aggregated MAC protocol data unit (AMPDU) duration control in a wireless communication device, the instructions when executed by a processor cause the processor to execute a process comprising:
for a first AMPDU in a time window, W, detecting if a Doppler effect exists for a data transmission;
decreasing the initial AMPDU duration if the Doppler effect is detected; and
increasing the initial AMPDU duration if the Doppler effect is not detected.

27. The computer-readable medium of claim 26, further comprising if the Doppler effect is detected, determining if the detected Doppler effect is significant, wherein:
increasing the initial AMPDU duration if the Doppler effect is not detected is by a first value, and
decreasing the initial AMPDU duration if the Doppler effect is detected is by:
a second value if the Doppler effect is detected but is not determined to be significant, and
a third value if the Doppler effect is detected and is determined to be significant, wherein the second value does not equal the third value.

28. The computer-readable medium of claim 27, wherein the first value is 0 microseconds, the second value is 200 microseconds, and the third value is 400 microseconds.

29. A non-transitory, computer-readable medium storing computer-executable instructions for providing aggregated MAC protocol data unit (AMPDU) duration control in a wireless communication device, the instructions when executed by a processor cause the processor to execute a process comprising:
determining if a data transmission between two devices is line-of-sight (LoS) communication;
if not determined that the data transmission is LoS communication, decreasing the initial AMPDU duration by a first value, and
if determined that the data transmission is LoS communication, increasing the initial AMPDU duration by a second value.

30. The computer-readable medium of claim 29, wherein the first value is 0 microseconds, and the second value is 200 microseconds.

31. A non-transitory, computer-readable medium storing computer-executable instructions for providing aggregated MAC protocol data unit (AMPDU) duration control in a wireless communication device, the instructions when executed by a processor cause the processor to execute a process comprising:
    determining if data is being transmitted between devices using multi-user beam forming (MU-BF);
    if determined that MU-BF is not used, increasing an initial AMPDU duration by a first value; and
    if determined that MU-BF is used, decreasing the initial AMPDU duration by a second value.

32. The computer-readable medium of claim 31, wherein the first value is 0 microseconds and the second value is 400 microseconds.

33. A wireless communication device providing an aggregated MAC protocol data unit (AMPDU) duration control, the device comprising:
    means for initializing an AMPDU duration;
    means for setting a time window, W, to a multiple of the AMPDU duration;
    means for collecting pass/fail statistics for a first set of MAC protocol data units (MPDUs) and a second set of MPDUs from a data transmission during the time window; and
    means for using the collected pass/fail statistics, calculating a packet error rate (PER) difference, $\Delta P$, between the first set of MPDUs and the second set of MPDUs for each AMPDU in the time window;
    means for calculating an average PER difference, $\Delta P_{AVG}$, across all AMPDUs in the time window;
    means for performing one action from a group comprising:
        if $\Delta P_{AVG}$ is greater than an upper threshold, decreasing the AMPDU duration by a first value,
        if $\Delta P_{AVG}$ is less than a lower threshold, increasing the AMPDU duration by a second value, and
        if $\Delta P_{AVG}$ is within the upper threshold and the lower threshold, continuing from a next window; and
    means for continuing from setting the time window.

34. The wireless communication device of claim 33, wherein means for calculating the $\Delta P$ between the first set of MPDUs and the second set of MPDUs further comprises:
    means for determining a packet error rate for a first integer N MPDUs of the AMPDU, wherein the first N MPDUs are included in the first set of MPDUs and N is a positive integer;
    means for determining a packet error rate for a separate N MPDUs of the AMPDU, wherein the second N MPDUs are included in the second set of MPDUs;
    means for subtracting the packet error rate for the first N MPDUs from the packet error rate for the second N MPDUs;
    means for dividing the result of the subtraction by N; and
    means for using the resulting quotient as the packet error rate difference, $\Delta P$, for the AMPDU.

35. The wireless communication device of claim 34, wherein means for calculating an average PER difference across all AMPDUs in the window comprises:
    means for forming a sum of the packet error rate differences; and
    means for dividing the sum by a total of AMPDUs transmitted during the time window to form an average PER difference, $\Delta P_{AVG}$.

36. The wireless communication device of claim 33, wherein the upper threshold is 0.2 microseconds.

37. The wireless communication device of claim 33, wherein the lower threshold is 0.05 microseconds.

38. The wireless communication device of claim 33, wherein the first value is 200 microseconds and the second value is 200 microseconds.

39. The wireless communication device of claim 33, wherein the at least one action from the group further comprises:
    means for preventing the AMPDU duration from being decreased to less than a first duration limit; and
    means for preventing the AMPDU duration from being increased to greater than a second duration limit.

40. The wireless communication device of claim 39, wherein the first duration limit is 100 microseconds and the second duration limit is 4000 microseconds.

41. The wireless communication device of claim 33, wherein each time window has a duration equal to a single AMPDU duration.

42. A wireless communication device providing an aggregated MAC protocol data unit (AMPDU) duration control, the device comprising:
    for a first AMPDU in a time window, W, means for detecting if a Doppler effect exists for a data transmission;
    means for decreasing the initial AMPDU duration if the Doppler effect is detected; and
    means for increasing the initial AMPDU duration if the Doppler effect is not detected.

43. The wireless communication device of claim 42, wherein:
    increasing the initial AMPDU duration if the Doppler effect is not detected is by a first value, and
    decreasing the initial AMPDU duration if the Doppler effect is detected is by:
        a second value if the Doppler effect is detected but is not determined to be significant, and
        a third value if the Doppler effect is detected and is determined to be significant, wherein the second value does not equal the third value.

44. The wireless communication device of claim 43, wherein the first value is 0 microseconds, the second value is 200 microseconds, and the third value is 400 microseconds.

45. A wireless communication device providing an aggregated MAC protocol data unit (AMPDU) duration control, the device comprising:
    means for determining if a data transmission between two devices is line-of-sight (LoS) communication;
    if not determined that the data transmission is LoS communication, means for decreasing the initial AMPDU duration by a first value, and
    if determined that the data transmission is LoS communication, means for increasing the initial AMPDU duration by a second value.

46. The wireless communication device of claim 45, wherein the first value is 0 microseconds, and the second value is 200 microseconds.

47. A wireless communication device providing an aggregated MAC protocol data unit (AMPDU) duration control, the device comprising:
    means for determining if data is being transmitted between devices using multi-user beam forming (MU-BF);
    means for increasing an initial AMPDU duration by a first value if determined that MU-BF is not used; and
    means for decreasing the initial AMPDU duration by a second value if determined that MU-BF is used.

48. The wireless communication device of claim 47, wherein the first value is 0 microseconds and the second value is 400 microseconds.

* * * * *